United States Patent
Andersson et al.

(10) Patent No.: US 6,334,047 B1
(45) Date of Patent: Dec. 25, 2001

(54) ADAPTIVE POWER CONTROL IN A MOBILE RADIO COMMUNICATIONS SYSTEM

(75) Inventors: Christoffer Andersson; Mårten Ericson, both of Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/288,860

(22) Filed: Apr. 9, 1999

(51) Int. Cl.[7] .............................. H04B 1/00; H04Q 7/20

(52) U.S. Cl. ............................................ 455/69; 455/436

(58) Field of Search ............................ 455/69, 126, 522, 455/442, 436, 437, 226.2, 226.3, 63, 67.3; 370/342, 311, 335, 331, 332

(56) References Cited

U.S. PATENT DOCUMENTS

| | | |
|---|---|---|
| 5,056,109 | 10/1991 | Gilhousen et al. . |
| 5,107,487 | 4/1992 | Vilmur et al. . |
| 5,267,262 | 11/1993 | Wheatley, III . |

(List continued on next page.)

FOREIGN PATENT DOCUMENTS

| | | |
|---|---|---|
| 0 680 160 A | 11/1995 | (EP) . |
| 0 682 419 A | 11/1995 | (EP) . |
| 0 809 365 A | 11/1997 | (EP) . |

(List continued on next page.)

OTHER PUBLICATIONS

Power Control under Soft Handover, FPLMTS Study Committee, Air–interface WG, SWG2, Document No. AIF/SWG2–16–18 (P), Matsushita Communication Industrial Co., Ltd., Mar. 30, 1998.

Power Control under Soft Handover, FPLMTS Study Committee, Air–interface WG, SWG2, Document No. AIF/SWG2–15–2 (C), Matsushita Communication Industrial Co., Ltd., Mar. 11, 1998.

(List continued on next page.)

*Primary Examiner*—Dwayne Bost
*Assistant Examiner*—Joy Contee
(74) *Attorney, Agent, or Firm*—Nixon & Vanderhye, P.C.

(57) ABSTRACT

An efficient and effective power control in a mobile communications system is provided that adapts to rapidly changing radio transmission conditions in varying and often unpredictable situations. The value of a signal parameter detected from a signal received by a radio transceiver is compared with a desired signal parameter value, and a difference is determined. A transmit power control command is sent to the radio transceiver and may instruct, for example, an increase or decrease in the level of radio transmit power. Included with the transmit power control command is a power control indicator indicating whether a first or a second type of power control adjustment should be used by the radio transceiver depending upon the determined difference. In one example embodiment, the power control indicator is a single-flag bit. A first value indicates that the first type of power control adjustment should be used; the second value indicates that the second type of power control adjustment should be used. In any event, the power control indicator itself does not include specific details of the first or second type of power control adjustment. Because only the indicator is sent (and not the details), signaling overhead and bandwidth consumption related to frequently sent power control commands are kept to a minimum. The specific details of the first and second power control adjustments are initially stored in to the radio transceiver. Such details may be updated when desirable, but the frequency of such updating is likely to be infrequent. Alternatively, a power control indicator may be communicated using techniques other than adding one or more flag bits to a fast transmit power control message to effect a change in power control type as long as signaling overhead is not significantly increased.

44 Claims, 6 Drawing Sheets

U.S. PATENT DOCUMENTS

| | | |
|---|---|---|
| 5,430,760 | 7/1995 | Dent . |
| 5,491,837 | 2/1996 | Haartsen . |
| 5,551,057 | 8/1996 | Mitra . |
| 5,574,982 | 11/1996 | Almgren et al. . |
| 5,590,409 * | 12/1996 | Sawahashi et al. ............. 455/69 |
| 5,604,730 | 2/1997 | Tiedemann, Jr. . |
| 5,710,982 * | 1/1998 | Laborde et al. ............. 455/69 |
| 5,715,526 | 2/1998 | Weaver, Jr. et al. . |
| 5,790,940 * | 8/1998 | Laborde et al. ............. 455/69 |
| 5,799,005 | 8/1998 | Soliman . |
| 6,144,861 * | 7/2000 | Sundelin et al. ............. 455/522 |

FOREIGN PATENT DOCUMENTS

| | | |
|---|---|---|
| 97/02665 | 1/1997 | (WO) . |
| 97/26716 A | 7/1997 | (WO) . |
| 99/08398 A | 2/1999 | (WO) . |

OTHER PUBLICATIONS

TIA/EIA Interim Standard Mobile Station–Base Station Compatibility Standard for Dual–Mode Wideband Spread Spectrum Cellular System, TIA/EIA/IS–95, Jul. 1993.

A. Salmasi et al.: "On the System Design Aspects of Code Division Multiple Access (CDMA) Applied to Digital Cellular and Personal Communications Networks," Gateway to the Future—Technology in Motion, St. Louis, May 19–22, 1991, No. Conf. 41, May 19, 1991, pp. 57–62, XP000260154, Institute of Electrical and Electronics Engineers.

Derwent Abstract No. 95–384440, 1998, Transmission Power Control Method for CDMA System Reducing Transmission Power Quickly To Prevent Interference With Other Mobile Stations, e.g. Due to Change in Buildings Surrounding Mobile Station.

L. Song et al., Lucent Technologies, Adaptive Power Control Step Size, 1998.

U.S. Patent application Ser. No. 08/733,501.
U.S. Patent application Ser. No. 08/847,655.
U.S. Patent application Ser. No. 08/096,930.
U.S. Patent application Ser. No. 09/189,629.
U.S. Patent application Ser. No. 09/055,781.
U.S. Patent application Ser. No. 09/267,686.

* cited by examiner

ADAPTIVE POWER CONTROL IN A MOBILE RADIO COMMUNICATIONS SYSTEM

FIELD OF THE INVENTION

The present invention relates radio transmission power control in a code division multiple access cellular radio communications system.

BACKGROUND AND SUMMARY OF THE INVENTION

In a cellular communications system, a mobile radio station communicates over an assigned radio channel with a radio base station. Several base stations are connected to a switching node which is typically connected to a gateway that interfaces the cellular communications system with other communication systems. A call placed from an external network to a mobile station is directed to the gateway, and from the gateway through one or more switching nodes to a base station which serves the called mobile station. The base station pages the called mobile station and establishes a radio communications channel. A call originated by the mobile station follows a similar path in the opposite direction.

In a Code Division Multiple Access (CDMA) mobile communication system, spreading codes are used to distinguish information associated with different mobile stations or base stations transmitting over the same radio frequency band. In other words, individual radio "channels" correspond to and are discriminated on the basis of these codes. Various aspects of CDMA are set forth in one or more textbooks such as *Applications of CDMA and Wireless/Personal Communications*, Garg, Vijay K. et al., Prentice-Hall 1997.

Spread spectrum communications permit mobile transmissions to be received at two or more ("diverse") base stations and processed simultaneously to generate one received signal. With these combined signal processing capabilities, it is possible to perform a handover from one base station to another, (or from one antenna sector to another antenna sector connected to the same base station), without any perceptible disturbance in the voice or data communications. This kind of handover is typically called diversity handover.

During diversity handover, the signaling and voice information from plural sources is combined in a common point with decisions made on the "quality" of the received data. In soft handover, as a mobile station involved in a call moves to the edge of a base station's cell, the adjacent cell's base station assigns a transceiver to the same call while a transceiver in the current base station continues to handle that call as well. As a result, the call is handed over on a make-before-break basis. Soft diversity handover is therefore a process where two or more base stations handle the call simultaneously until the mobile station moves sufficiently close to one of the base stations which then exclusively handles the call. "Softer" diversity handover occurs when the mobile station is in handover between two different antenna sectors connected to the same, multi-sectored base station using a similar make-before-break methodology.

Because all users of a CDMA communications system transmit information using the same frequency band at the same time, each user's communication interferes with the communications of the other users. In addition, signals received by a base station from a mobile station close to the base station are much stronger than signals received from other mobile stations located at the base station's cell boundary. As a result, distant mobile communications are overshadowed and dominated by close-in mobile stations which is why this condition is sometimes referred as the "near-far effect."

The physical characteristics of a radio channel vary significantly for a number of reasons. For example, the signal propagation loss between a radio transmitter and receiver varies as a function of their respective locations, obstacles, weather, etc. As a result, large differences may arise in the strength of signals received at the base station from different mobiles. If the transmission power of a mobile station signal is too low, the receiving base station may not correctly decode a weak signal, and the signal will have to be corrected (if possible) or retransmitted. Accordingly, erroneous receipt of the signals adds to the delay associated with radio access procedures, increases data processing overhead, and reduces the available radio bandwidth because erroneously received signals must be retransmitted. On the other hand, if the mobile transmission power is too high, the signals transmitted by the mobile station create interference for the other mobile and base stations in the system. Ideally, all mobile-transmitted signals should arrive at the base station with about the same average power irrespective of their distance from the base station.

Interference is a particularly severe problem in CDMA systems because large numbers of radios transmit on the same frequency. If one mobile station transmits at a power output that is too large, the interference it creates degrades the signal-to-interference ratio (SIR) of signals received from other mobile radios to the point that a receiving base station cannot correctly demodulate transmissions from the other mobile radios. In fact, if a mobile station transmits a signal at twice the power level needed for the signal to be accurately received at the base station receiver, that mobile signal occupies roughly twice the system capacity as it would if the signal were transmit at the optimum power level. Unregulated, it is not uncommon for a strong mobile station to transmit signals that are received at the base station at many, many times the strength of other mobile transmissions. The loss of system capacity to such excessively "strong" mobile stations is unacceptable.

Additional problems are associated with transmitting with too much power. One is the so-called "party effect." If a mobile transmits at too high of a power level, the other mobiles may increase their respective power levels so that they can "be heard" compounding the already serious interference problem.

Another problem is wasted battery power. It is very important to conserve the limited battery life in mobile radios. By far, the largest drain on a mobile's battery occurs during transmission. A significant objective for any power control approach, therefore, is to reduce transmit power where possible without increasing the number of retransmissions to an unacceptably high level as a consequence of that power reduction. Except for battery consumption, the above-described problems with setting transmission power also apply to downlink radio transmissions from base stations.

Transmit power control (TPC) is therefore important in any mobile radio communications system, and is a particularly significant factor in improving the performance and capacity of a CDMA system. In uplink TPC, the mobile station attempts to control its transmit power based on the power control messages sent to the mobile station from the base station with the goal of controlling the power level of signals received at the base station within a relatively small tolerance, e.g., 1 dB for all mobile station transmissions received at that base station.

More specifically, transmit power control strives to keep the received carrier-to-interference ratio (CIR) close to a target CIR. Alternate measures of signal quality may also be used such as received signal-to-interference ratio (SIR), received signal strength (RSSI), etc. The carrier-to-interference ratio actually received at a base station or mobile station depends on the received carrier power and the current interference level. Received carrier power corresponds to the transmit power level $P_{tx}$ minus the path loss L. The path loss L may also be represented as a negative gain. Such a gain factor includes two components for a radio channel: a slow fading gain $G_s$, and a fast fading gain $G_f$. The interference from other users in the CDMA system also depends on the spreading factor employed by other transmitters. Accordingly, the carrier-to-interference ratio may be roughly determined in accordance with the following:

$$CIR = \frac{P_i G_i}{\sum_{k=otherusers} \frac{P_k G_k}{SF_k} + N} \quad (1)$$

where P corresponds to the transmit power level, G corresponds to the path gain (including both fast and slowing fading components), SF is the spreading factor which is equal to the number of "chips" used to spread a data symbol, and N is the background noise.

The power related issues described above for uplink (or reverse) power control for transmissions from the mobile station to the base station also apply in the downlink (or forward) transmit direction from a transceiver in the base station to the mobile station. In downlink power control, the base station varies the power of the transceiver transmitting to the mobile station depending on downlink transmit power control messages or commands sent by the mobile station.

Because power control in CDMA systems is very important, transmit power control adjustments often occur very frequently, e.g., every 0.625 milliseconds. During transmit power regulation, each station (mobile and base) continually measures the transmit power level received from the other station and determines whether the measured value is greater than a reference value. If so, a transmit power control bit having one value is sent from one station instructing the other station to decrease its transmit power by a predetermined increment, e.g., 1 dB, down to a minimum transmit power value. On the other hand, when the measured value is less than the reference value, the transmit power control bit(s) with the opposite value(s) is (are) transmit to increase transmit power by a predetermined increment, e.g., 1 dB, up to a maximum value. Because power control commands occur very frequently, it is desirable not to use large numbers of bits to avoid increasing the signaling "overhead."

Various factors may cause the received carrier-to-interference ratio to differ from a target carrier-to-inference ratio by as much as 10 dB or more. These factors include environmental conditions such as a rapidly varying radio channel, changing temperatures which affect the performance of radio equipment, practical implementation limitations (e.g., non-linear components used to construct base and mobile stations), and delays in power control commands to name a few. One way to approach power control in view of such problems is to employ to employ an open loop power control in combination with a closed loop power control. In open loop power control, the transmit power is calculated at the transmitter based on one or more parameters, and the calculated value is used to set the transmit power level. The transmit power may be adjusted in order to match an estimated path loss so that the signal is received at the base station at a predetermined power level. Closed loop power control relies on feedback from the receiver so that the transmitter knows, for example, at what CIR level the transmitted signal was received. Using this feedback, the transmitter then appropriately adjusts its transmit power level. A drawback with this approach is its complexity in that two types of power control must be implemented and coordinated. It is often difficult to guarantee that the two power control schemes work together harmoniously and special hardware may be needed to "mix" these two types of power control. Another drawback is that since this approach responds to path loss changes, it does not compensate for changes in interference.

Another less complex approach is a power "ramping" power control technique such as described in Ericsson's U.S. Pat. No. 5,430,760 to Dent. The mobile station initiates a random access at a low initial transmit power level and gradually (e.g., incrementally) increases the transmission power level until the base station detects and acknowledges the access signal. Once detected, the power level of the message is maintained at the detected level.

While both of these approaches are useful, neither is optimum in all situations and in all respects. As can be seen from equation (1), the interference from other users depends to a significant extent on the spreading factor employed by that user. A low spreading factor corresponding to a smaller number of chips per symbol increases the interference generated by user i considerably. Consider the following scenario. A mobile user, having a low spreading factor or otherwise transmitting at a high power, is traveling through a city with a number of buildings and other obstacles. The serving base station is relatively far way. However, as the mobile user rounds a street corner, the user is suddenly very close to another base station previously shadowed or blocked by that building. One practical effect is that when this mobile transmitting at high power rounds the corner, it "blasts" the new, closer base station and nearby users currently being served by that base station. The net result is a large, unnecessary increase in interference in the new base station's cell(s) which lowers the carrier-to-interference ratio for the other mobile users in the cell(s). Consequently, those other mobile users will increase their transmit power levels in order to maintain a reasonable carrier-to-interference ratio, i.e., the party effect referred to above.

Another example concerns mobile data users that employ low spreading factors. Such users typically do not significantly increase the interference level as long as their data sending/receiving activities are low. However, should such low spreading factor data users start transmitting at a high data rate, that transmission will be at a much larger transmit power suddenly increasing the interference level. If a 1 dB stepsize is employed to decrease that user's transmit power, other users in that cell will not be able to raise their output power fast enough to compensate for this new situation.

What is needed, therefore, is an effective power control mechanism that quickly decreases the power of such a mobile user. Such a power control mechanism should also preferably raise power quickly as well but more restrictively than when decreasing power. One approach is to vary the step size in the incremental power control approach mentioned above to accommodate both large and small step sizes. Normally, a relatively small step size is employed. But in situations like that just described where a high power transmission mobile rounds a corner, a large power decrease step is necessary to reduce that mobile's power quickly and by a significant amount. A variable step size also addresses problems related to rapid fading of a radio channel where a mobile is traveling at high speed. Quickly changing fading conditions of the radio channel mean that the transmit power to and from that mobile terminal must be adjusted rapidly using variable step sizes when such changes are detected. Even so, for a fast moving mobile user, it still may be quite difficult to compensate for fast fading. In that case, a 1 dB power step size may be too large or will only serve to increase power fluctuations, and it may be better to use small size power steps in this situation.

A drawback with sending variable step size power control commands is added overhead. In order to compensate for quickly changing transmission conditions, the variable step sizes must be transmit very frequently. In the example where a TPC command is sent every 0.625 msec time slot, a variable step size value is transmit 1,600 times per second. When frequently transmitted, variable step size commands enable the transmit power control to track fast channel fading and other abrupt changes in transmission condition relatively well. However, there is a need to reduce undesirable signaling overhead associated with sending so much step size data and the associated loss of useable radio bandwidth for user traffic.

It is an object of the present invention to overcome the problems identified above, and in particular, to provide both efficient and effective power control in a mobile communications system.

It is an object of the present invention to achieve a power control technique that adapts to rapidly changing radio transmission conditions and situations.

It is an object of the present invention to provide an adaptive power control technique that ensures a satisfactory quality of communication at a minimum level of interference.

It is an object of the present invention to provide an adaptive power control technique with a minimal amount of control signaling overhead.

The present invention overcomes the identified problems and meets these and other objectives by efficiently and effectively controlling the transmit power of a radio transceiver. The value of a signal parameter detected from a signal received by the radio transceiver is compared with a desired signal parameter value, and a difference is determined. A transmit power control command is sent to the radio transceiver and may instruct, for example, an increase or decrease in the level of radio transmit power. Associated with the transmit power control command is a power control indicator indicating which type of power control adjustment should be used by the radio transceiver depending upon the determined difference. For example, one or more flag bits may accompany the power control command. Depending on a number of indicator bits employed, many different power control adjustments may be employed.

Other types of indicators with low overhead may also be employed. For example, different power control command bit patterns may be used. One pattern corresponds to a first type of power control adjustment and another pattern corresponds to another type of power control adjustment. Different power control adjustment type messages may also be conveyed using other, non-power related control signaling messages frequently exchanged between the base and mobile stations. Moreover, any message that is sent in the normal operation and/or control of the base and mobile stations may be used to convey power control adjustment type messages without significantly adding to the overhead.

In one example embodiment, the power control indicator includes a single flag bit. A first value indicates that a first type of power control adjustment should be used; the second value indicates that a second type of power control adjustment should be used. In any event, the power control indicator itself does not include specific details of the first or second type of power control adjustment. Because only the indicator is sent (and not the details), signaling overhead and bandwidth consumption related to frequently sent transmit power control commands are kept to a minimum. The details of the first and second power control adjustments are initially stored in the radio transceiver. Such details may be updated when desirable, but the frequency of such updating is likely to be infrequent.

The first and second type of power control adjustments may include a first and second power adjustment step size, where one step size might be used in one type of power adjustment situation and another step size might be used in another type of situation. Alternatively, the first and second type of power control adjustments might correspond to two different power control schemes for adjusting the transmit power of the radio transceiver. The invention may be implemented for "uplink" power control in a radio network node with the radio transceiver corresponding to one or more mobile stations. In addition, the invention may be implemented for the "downlink" direction in a mobile station with the radio transceiver corresponding to a base station in the radio network.

BRIEF DESCRIPTION OF THE DRAWINGS

The foregoing and other objects, features, and advantages of the invention will be apparent from the following description of preferred embodiments as well as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. For example, the present invention may be applied advantageously to control the transmit power of mobile station transmissions on uplink/reverse direction radio channels. The present invention may also be advantageously employed to control the transmit power of a radio transceiver in a base station in a downlink/forward direction as well. In other instances, detailed descriptions of well-known methods, interfaces, devices, and signaling techniques are omitted so as not to obscure the description of the present invention with unnecessary detail.

Figure 1:
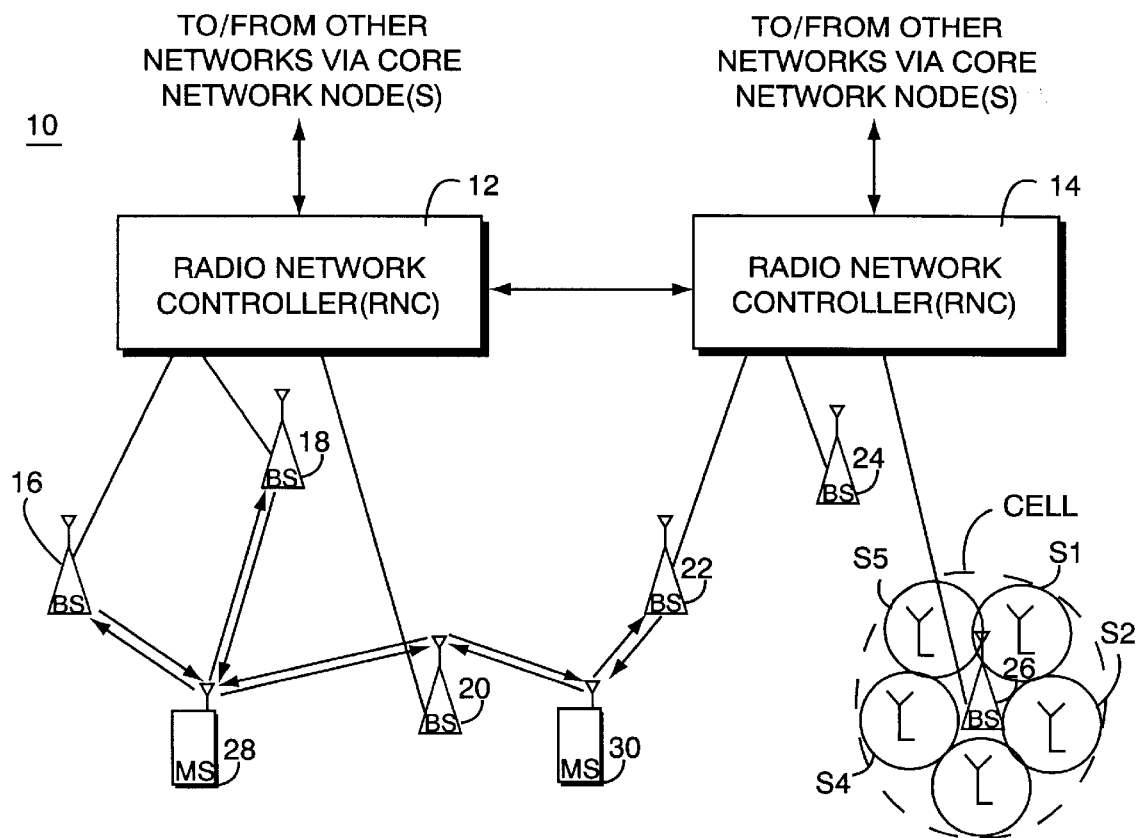
FIG. 1 is a high level diagram of an example communications system in which the present invention may be employed.

A mobile radio cellular communications system 10 is shown in FIG. 1 and may be, for example, a CDMA or a wideband CDMA communications system. Radio network controllers (RNCs) 12 and 14 control various radio network functions including for example radio access bearer setup, diversity handover, etc. Radio network controller 12 is coupled to a plurality of base stations 16, 18, and 20. Radio network controller 14 is connected to base stations 22, 24, and 26. Each base station serves a geographical area referred to as a cell, and a cell may be divided into plural sectors. Base station 26 is shown as having five antenna sectors S1–S5. Each sector also has a corresponding cell area so that in this situation the base station serves five cells. The base stations are connected to their corresponding radio network controller by various means such as dedicated telephone lines, optical fiber links, microwave links, etc. Both radio network controllers 12 and 14 are connected with external networks such as the Public Switched Telephone Network (PSTN), the Internet, etc. through one or more core network nodes like a mobile switching center and/or a packet radio service node (not shown). The RNC directs mobile station calls via the appropriate base station(s).

In FIG. 1, two mobile stations 28 and 30 are shown communicating with plural base stations. Mobile station 28 communicates with base stations 16, 18, and 20, and mobile station 30 communicates with base stations 20 and 22. A control link between radio network controllers 12 and 14 permits diversity communications to/from mobile station 30 via base stations 20 and 22. Each radio communication channel established between the mobile station and a base station has an uplink component and a downlink component. Since multiple communications utilize the same radio frequencies in CDMA communication, spreading codes along with other well-known CDMA techniques are used to distinguish between the various mobile station and base station communications. In this example embodiment, the term "channel" refers to a CDMA channel which, for any mobile station, is defined in terms of an RF frequency and a particular code sequence.

Figure 2:
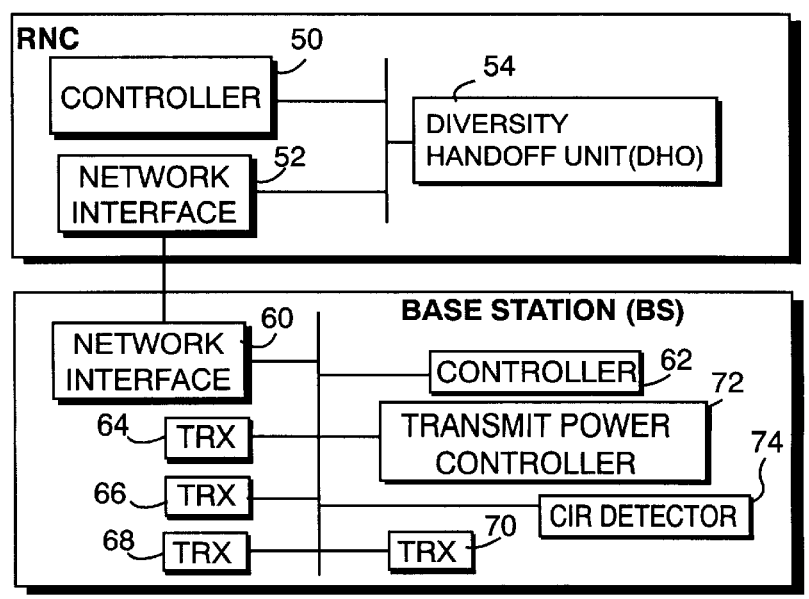
FIG. 2 is a function block diagram of a radio network controller and a base station illustrated in FIG. 1.

Additional details of a base station and a radio network controller are now provided in conjunction with FIG. 2. Each radio network controller (RNC) includes a network interface 52 for interfacing communications with various base stations. Within the RNC, the network interface 52 is connected to a controller 50 and to a diversity handover unit (DHO) 54. Diversity handover unit 54 performs numerous functions required for establishing, maintaining, and dropping diversity connections such as diversity combining, diversity splitting, power control and other link related radio resource control algorithms. The RNC may include other control/functional units not necessary to the understanding of the invention.

Each base station includes a corresponding network interface 60 for interfacing with the RNC. In addition, the base station includes a controller 62 connected to a one or more transceivers. In this example, a plurality of transceivers (TRX) 64, 66, 68, and 70 are shown coupled to a transmit power controller 72. Controller 62 controls the overall operation of the base station as well as the establishment, maintenance, and release of radio connections. Representative transceivers 64–70 are individually assigned to specific communications with mobile stations. At least one transceiver is employed as a common control channel over which the base station transmits common signaling such as pilot, synchronization, or other broadcast signaling. Mobile stations within or near that base station's cell(s) monitor the common channel. Transmit power controller 72 performs power control operations. One or more carrier-to-interference ratio (CIR) detectors 74 (only one is shown for purposes of illustration) may be used to detect the CIR of signals received from mobiles. As mentioned in the background, other signal quality detectors may be employed, e.g., SIR, RSSI, etc.

Figure 3:
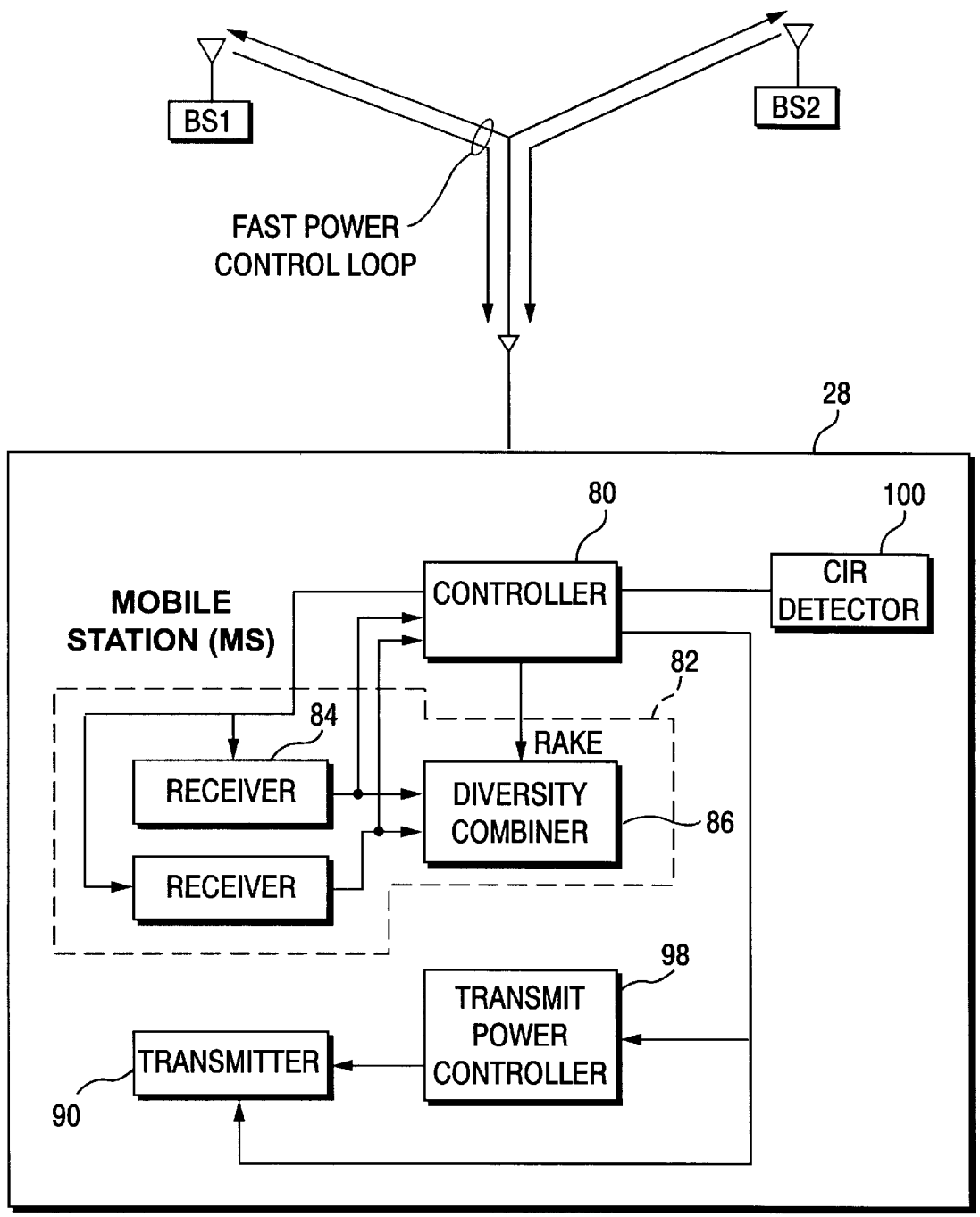
FIG. 3 is a function block diagram illustrating a mobile station shown in FIG. 1 as well as a fast power control loop in an example power control scheme in a mobile communications system.
Figure 4:
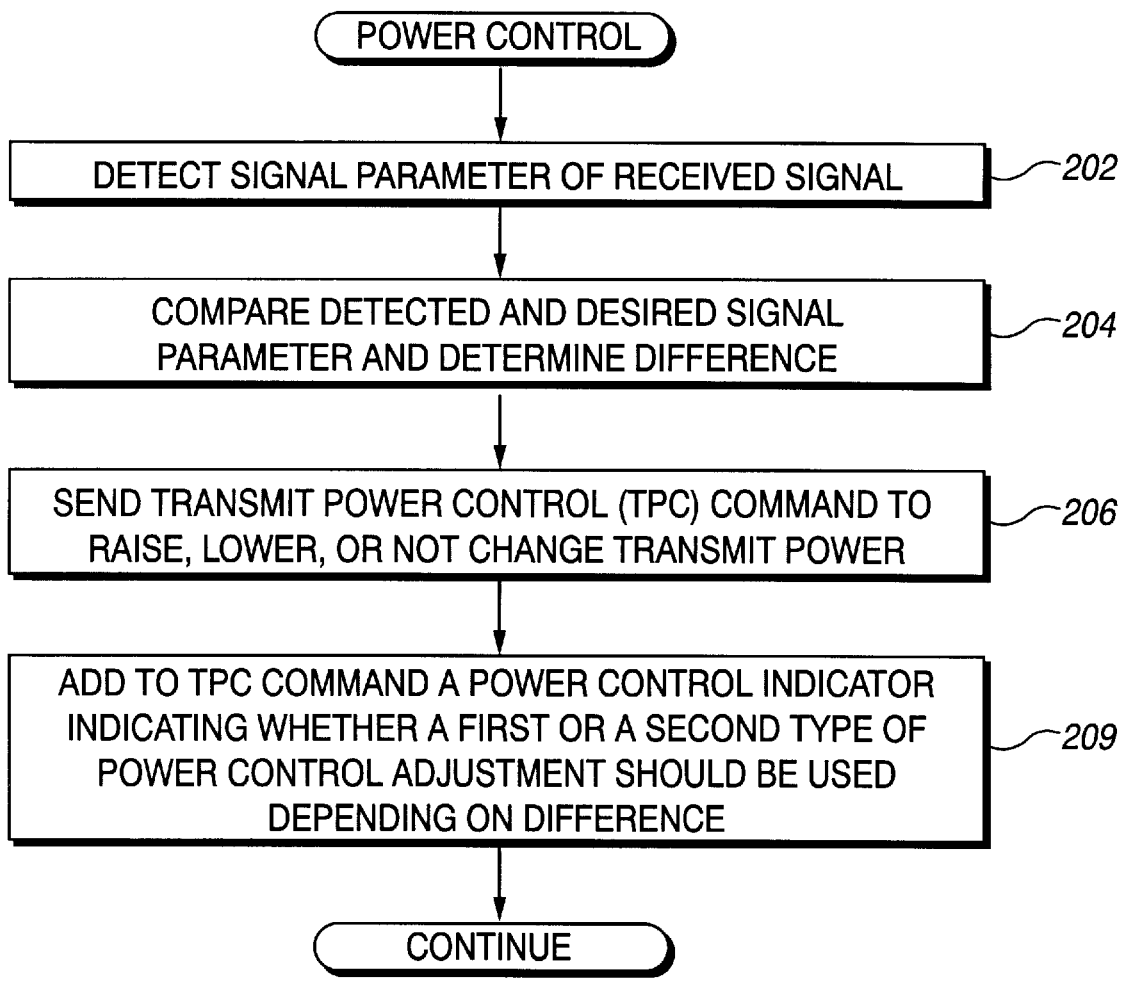
FIG. 4 illustrates a power control routine in accordance with one example embodiment of the present invention in flowchart format.

FIG. 3 illustrates additional details of a mobile station shown in FIG. 4. The mobile station includes a controller 80 connected to a RAKE receiver 82, a transmit power controller 88, a transmitter 90, and a CIR (or other signal quality) detector 100. The RAKE receiver 82 includes plural receivers 84 and 85 (there may be additional receivers as well) connected to a diversity combiner 86. One or more signal strength detectors (not shown) or similar detector(s) are employed in the mobile receiver 82 to detect the signal strength or other parameter of received signals. The transmissions from base stations are received as multipaths in the receivers 84 and 85, combining diversity combiner 86 and processed as one signal. Transmit power controller 88 determines the transmit power level (preferably as a carrier-to-interference ratio (CIR)) of the received, diversity-combined signal.

FIG. 3 also shows the fast power control loop between the mobile station and two base stations BS1 and BS2. Based upon CIR (or SIR) measurements of a received signal, the mobile station generates transmit power control commands sent to the base stations BS1 and BS2. Similarly, the base stations 1 and 2 send transmit power control commands to the mobile station based on CIR/SIR measurements made of signals received from that mobile station. The TPC commands may include one or more bits which indicate a desired increase in transmit power, a desired decrease in transmit power, or in some cases no change in transmit power. Of course, any number of bits or bit assignments is possible. In order to compensate for rapidly changing transmission conditions, these transmit power control commands are sent very frequently, and in one example embodiment, every 0.625 millisecond time slot or 1,600 times a second. Accordingly, this type of power control is referred to as fast, inner loop control. In addition, an optional, slow, outer control loop may also be employed in both uplink and downlink directions. The RNC monitors the quality reports provided from the base station and provides periodic updates with respect to target or reference CIR/SIR values.

A first example embodiment of the present invention is now described in conjunction with the power control routine (block 200) illustrated in FIG. 4. In this embodiment, the power control routine may be implemented in any type of radio transceiver and used to control the transmit power level in any direction, e.g., uplink and downlink. A controlling entity detects a signal quality parameter, such as carrier-to-interference ratio (CIR), of a signal received from a controlled radio (block 202). The detected signal quality parameter is compared to a desired signal quality parameter, e.g., a target CIR, and a difference is determined (block 204). A transmit power control command is sent to the radio transceiver to either raise, lower, or make no change to the transceiver's current transmit power (block 206). A power control indicator is added to the transmit power control command, and in its simplest form, may be a single flag bit. The power control indicator indicates whether a first type or a second type of power control adjustment should be used depending upon the difference (block 208).

Figure 5:
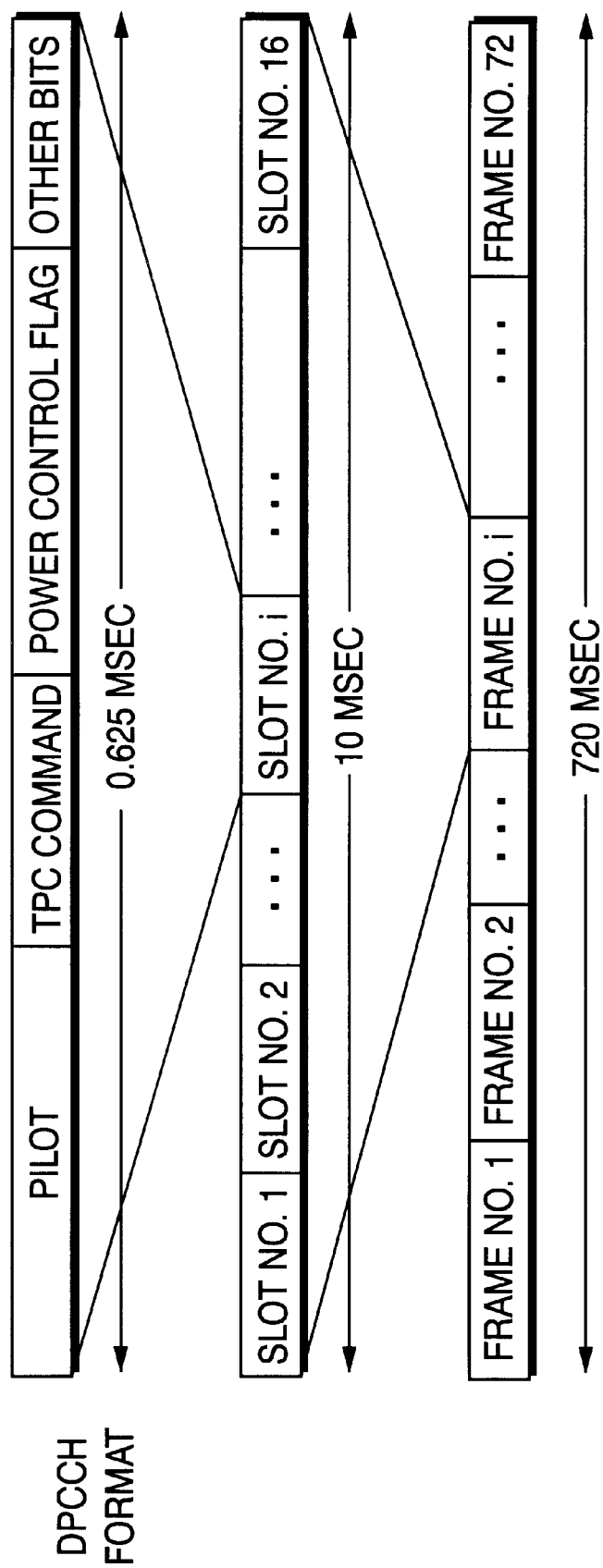
FIG. 5 illustrates an example format of a transmit power control message including a TPC command and a power control indicator.

FIG. 5 illustrates a sample power control message format that may be used in accordance with an example embodiment of the present invention. A dedicated physical control channel (DPCCH) is shown which is divided into 72 frames corresponding to a 720 msec recycle time period. Each 10 msec frame is made up of 16 time slots each lasting 0.625 msec. Each DPCCH time slot may include a pilot field used for synchronization, a traffic power control (TPC) command which may include a command to increase, decrease, or maintain transmit power, a power control indicator or flag, and other bits. This type of transmit power control message may be sent in the uplink direction and downlink direction of the dedicated physical control channel.

While in the above example, the power control type indicator is appended to one or more transmit power control commands and may include a single flag bit to minimize signaling overhead, the power control adjustment indicator may be conveyed using other mechanisms. An important objective is to efficiently and effectively communicate the type of power control adjustment scheme to the radio transceiver without significantly increasing signaling overhead. One alternative example mechanism is to use different power control command bit patterns to be employed. One pattern might correspond to a first type of power control adjustment and another pattern might correspond to another type of power control adjustment. Different power control adjustment type messages may also be conveyed along with other, non-power related control signaling messages that are typically frequently exchanged between the base and mobile radio stations. Indeed, a power control adjustment type indicator may be sent with any message transmitted in the normal operation and/or control of the radio receiver without significantly adding to the signaling overhead.

As one example of different types of power control adjustment, the first and second types of power control adjustments correspond to first and second step sizes. The first step size might be a typical step size change such as plus or minus 1 dB. The second step size might correspond to a larger amount, e.g., 8 dB. As a result, when the difference between the detected and the desired signal quality parameter is large, the radio transceiver is immediately commanded to change its transmit power by the larger step size amount to compensate for this large disparity.

More specifically, if the radio transceiver's transmit power is significantly higher than that desired, the transceiver's transmit power can be immediately reduced to minimize the interference on surrounding radio communications. Alternatively, if the radio transceiver's detected signal quality is far below that desired, e.g., as a result of a building shadow or a strong fade, the radio transceiver's transmit power may be significantly increased to immediately improve the quality of communication to/from that radio transceiver. However, in the latter situation, considerably more care is preferably taken when increasing the mobile's transmit power because of the potential for generating too much interference. It may be determined that only an incremental step size is used to increase power even though a larger step increase could be indicated.

In either of these situations, if only a small step size is used to gradually increase or gradually decrease the radio transceiver's transmit power, the transmission conditions would be less than optimal for quite some time. In the first overpowered transmission situation, the radio transceiver disrupts and interferes with the communications of other provided transceivers which results in those transceivers increasing their transmit power in order to be adequately heard and possibly escalating into a "party effect" situation. On the other extreme, if the radio transceiver's transmit power is much too low for too long, the radio connection may well be lost.

Another advantage of the fast and effective power control of the present invention is that it does not significantly increase the amount of overhead signaling to and from the radio transceiver. This is quite significant in fast transmit power control schemes in which the transmit power control commands are transmitted every time slot in order to quickly adapt to changes in system conditions, e.g., 1,600 times per second. While the variable step size power adjustment value and other details may be communicated along with each transmit power control command, that information content adds considerable overhead in terms of numbers of bits that must be set and transmit over the radio interface. It also reduces the bandwidth available for user traffic. With the present invention, varying the step size and even the type of power control scheme employed may be accomplished simply by transmitting a single bit value with the transmit power control command resulting in only a small overhead increase and bandwidth decrease. Alternate existing messages or other techniques, like the few examples mentioned above, may also be used to convey this information without much increase in overhead. However, if very fast power control type adjustment is desired, transmitting an indicator with the normal power control command is preferred. On the other hand, if speed is less important, the indicator may be transmitted along with existing control signaling.

The first and second type of power control adjustment may also correspond to first and second types of power control adjustment schemes. For example, in the first type of power control adjustment scheme, the power adjustment is a change of 1 dB each time slot. In the second type of power adjustment control scheme, the first slot corresponds to an adjustment of 2 dB, the second time slot 2 db, the third time slot 4 dB, the fourth time slot 4 dB, the fifth time slot 8 dB, the next time slot 8 dB, the next time slot 4 dB, the next time slot 4 dB and so forth. Table 1 shows an example:

| Power control scheme | Slot 1 | Slot 2 | Slot 3 | Slot 4 | Slot 5 | Slot 6 | Slot 7 | Slot 8 |
|---|---|---|---|---|---|---|---|---|
| First scheme | 1 dB | 1 dB | 1 dB | 1 dB | 1 dB | 1 dB | 1 dB | 1 dB |
| Second scheme | 2 dB | 2 db | 4 db | 4 db | 8 dB | 8 dB | 4 dB | 4 dB |

Of course, more than two power control schemes may be employed and selected using further bits, e.g., two power control indicator bits may be used to select one of four different control schemes.

In another example, assume that two redundant TPC bits are transmit every slot to increase reliability, e.g., "00"= lower power and "11"=raise power. Only two of the possible four combinations of these two bits are used. The other two combinations are then used to indicate two different power control adjustments. For example, "01", could be used to indicate one type of power control adjustment and "10" to indicate another type of power control adjustment. To further increase the reliability, TPC bits may be collected over a number of consecutive slots.

Thus, rather than actually transmitting an actual power control scheme or an actual step size value by which the transmit power should be increased or decreased along with each transmit power command (increase, decrease, or no change), the different power control schemes and different step size values may be pre-stored in or otherwise provided to the radio transceiver and appropriately referenced by the radio transceiver when the associated power control indicator is received. The cost of this very fast and flexible power control is the minimal signaling overhead associated with the one or more power control indicator bits. Moreover, the different power control adjustment schemes or values (which require many more bits than a power control indicator) may be changed whenever necessary by an occasional control message transmitted to the radio receiver. However, because such changes only infrequently occur (i.e., much less frequently than the TPC commands are sent), those changes would not considerably increase overall overhead signaling.

Figure 6:
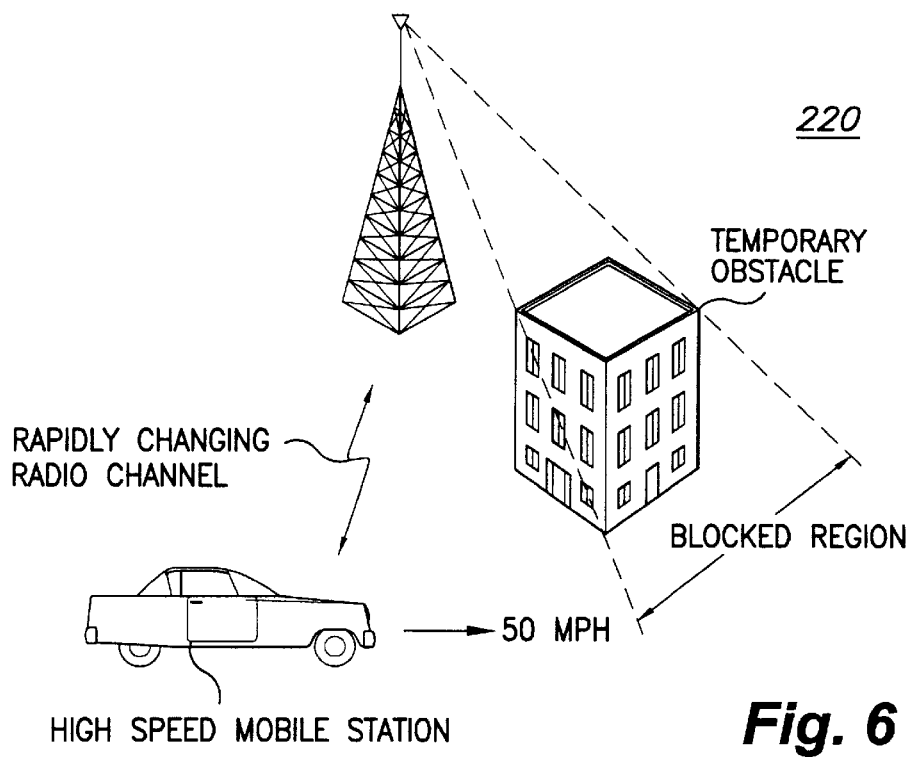
FIG. 6 illustrates pictorially a high speed mobile station situation in which the present invention may be advantageously employed.
Figure 7:
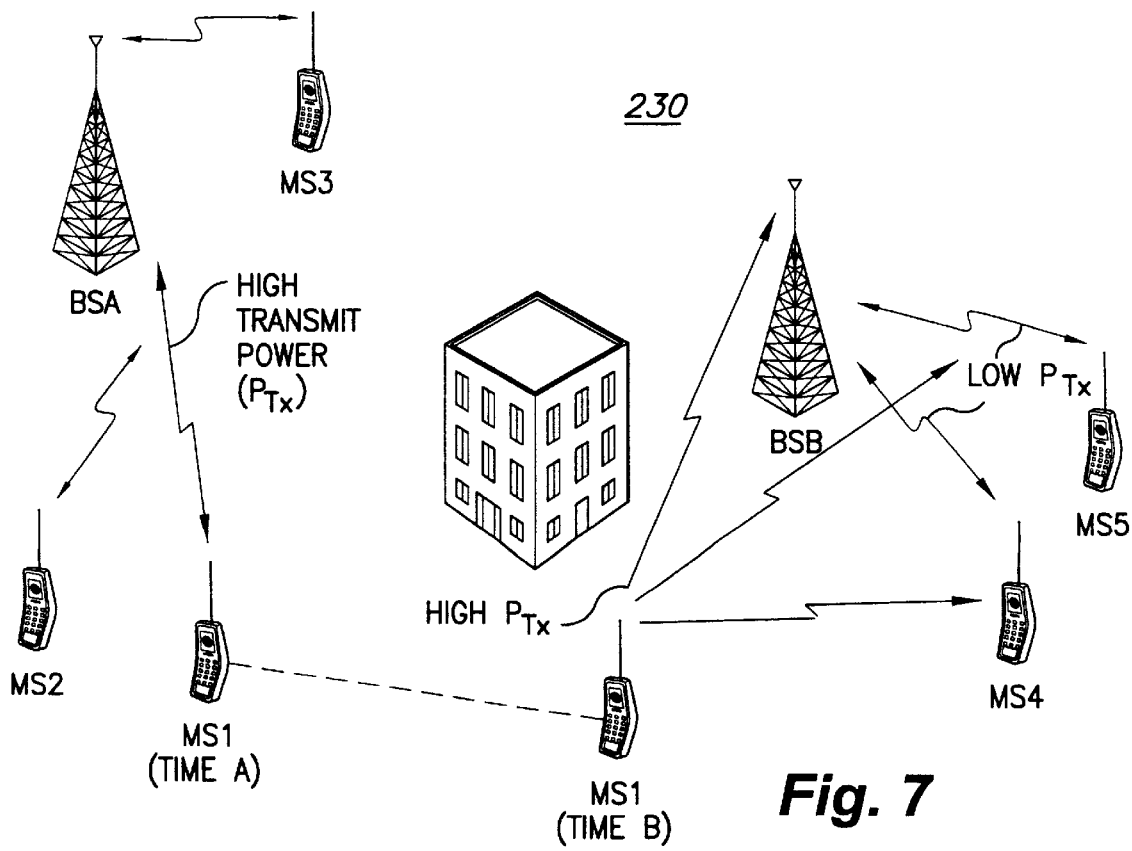
FIG. 7 illustrates pictorially a high power mobile interference problem that may be solved by the present invention.

Two example situations where the present invention may be advantageously employed are now described in conjunction with FIGS. 6 and 7. The following examples are described in the context of controlling the transmit power level of a mobile station transmitting in the uplink direction. Of course, the invention may also be employed to control the transmit power of a base station transceiver transmitting in the downlink direction. In the downlink direction, the invention may be implemented in the radio network controller, in the base station, in both, or in some other radio network node.

FIG. 6 shows an example scenario 220 of a mobile station traveling at a high speed where the radio channel is rapidly changing and fast fading is occurring. Referring to equation (1) above, the gain factor $G_f$ attributed to the fast fading changes significantly which changes the carrier-to-interference ratio significantly, rapidly, and unpredictably. Because the mobile station is also traveling quickly in a vehicle, it may be difficult to fully compensate for each detected fast fade. Indeed, a 1 dB power step change may be too large, and by the time it is implemented at the mobile station, it may only exacerbate gain fluctuations rather than ameliorate the problem. In this particular scenario 220, it may be decided to use smaller power steps. Accordingly, an alternative power control scheme is selected (by appropriately setting the power control flag) which provides very small power changes, e.g., less than 1 dB.

As the high speed mobile station approaches a temporary obstacle, such as a building, and moves to a location where the line of sight radio path between the mobile station and the base station is blocked, the detected CIR at the base station from the mobile station dramatically decreases. In order to maintain a reasonable quality connection with the mobile station, a different power control indicator is transmitted from the base station to indicate that the mobile should increase its transmit power substantially using a different, larger step size to quickly adjust to the conditions in the blocked region and maintain the connection quality.

FIG. 7 illustrates an overpowered mobile transmission scenario 230 in which the present invention may be advantageously employed. A mobile station MS1 at time A is far away from a serving base station BSA with which it is currently communicating. Because of the far distance, it is transmitting at a high transmit power. At time B, mobile station MS1 has moved behind a building blocking the line of sight between MS1 and BSA. This may cause an increase of an already high transmission power as the base station BSA tries to maintain the quality of connection with MS1 as it moves behind the building as just described in FIG. 6. Unfortunately, as MS1 rounds the corner of that building, it is quite near to another base station BSB at time B. Its transmit power is considerably overpowered causing severe interference with the base station transmissions and with the transmissions of mobile stations MS4 and MS5 transmitting at a much lower power level. As soon as this high power transmission from MS1 is detected via base station BSB, an immediate transmit power control command is returned to MS1 to decrease its power. In addition, a power control indicator indicates that the amount of power decrease should be large. As a result, in only one or several time slots, the transmit power of MS1 is brought to a reasonable level thereby minimizing the interference with the other mobile communications with BSB. If only a standard, typical step size of 1 dB is employed, the degree and length of interference would be much more significant.

Figure 8:
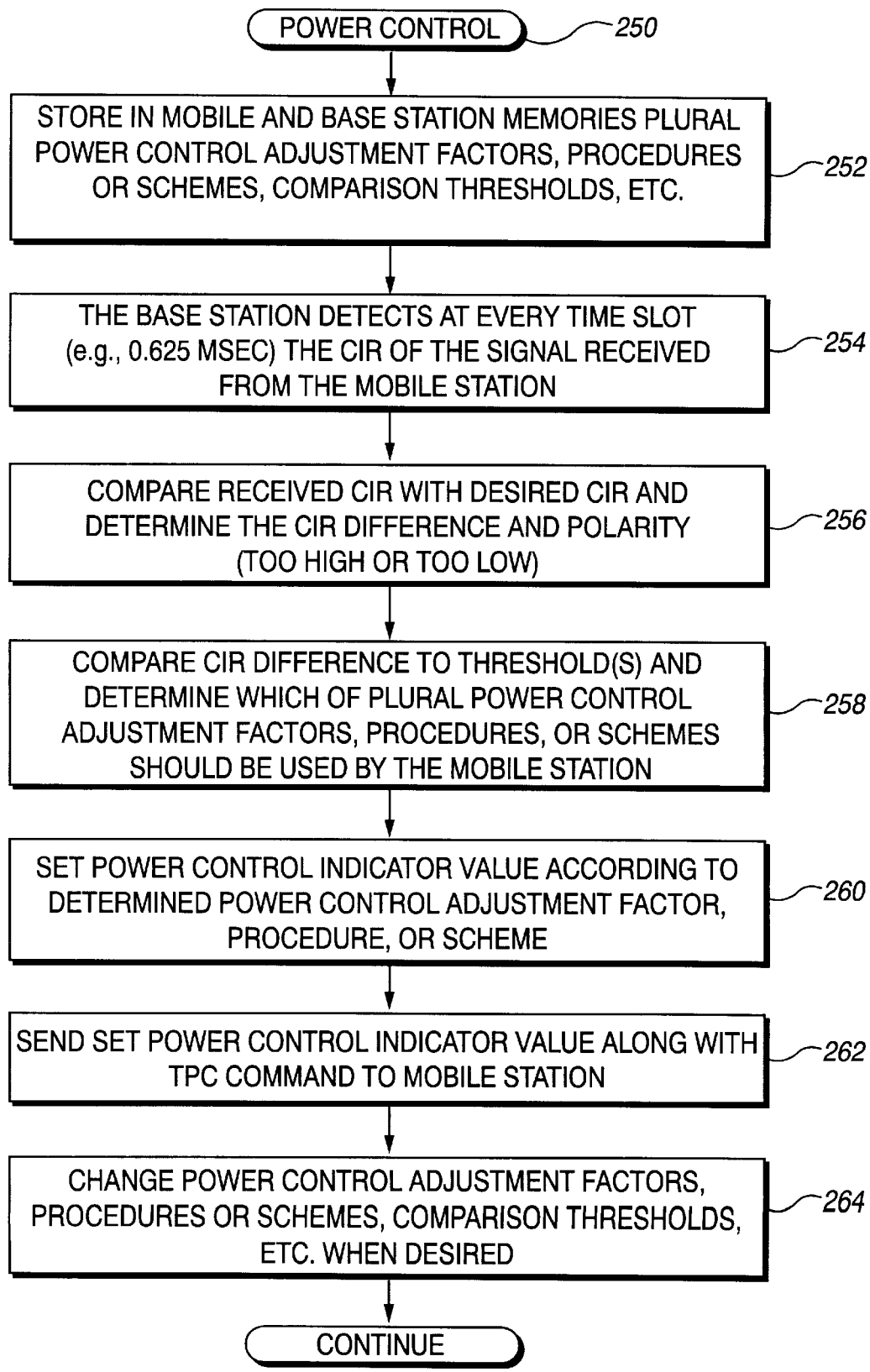
FIG. 8 illustrates another example embodiment of the present invention in flowchart form.

FIG. 8 illustrates a power control routine (block 250) in another example uplink embodiment of the present invention. Plural power control adjustment factors, procedures or schemes, comparison thresholds, etc. are either accessible by or provided to stored in a memory of the base station (and/or RNC or other radio network node) and one or more mobile stations (block 252). The base station detects at every time slot, (e.g., 0.625 milliseconds or 1,600 times per second), the CIR (or other signal quality parameter) of the signal received from the mobile station (block 254). The received CIR is compared with the desired CIR, and the base station determines the CIR difference and polarity, (i.e., whether the received CIR is too high or too low) (block 256). The CIR difference is then compared to one or more previously stored CIR thresholds to determine which of plural power control adjustment factors, procedures, or schemes, etc. should be used by the mobile station to adjust its current transmit power level (block 258). In addition, the value of the power control indicator is set according to the determined power control adjustment factor, procedure, or scheme (block 260). The set power control indicator value is sent along with the transmit power control command to the mobile station (block 262). The mobile station receives and detects the TPC command and power control indicator and makes the appropriate adjustment to its transmit power based thereon. The power control adjustment factors, procedures, or schemes, comparison thresholds, etc. may be optionally changed and updated in a memory of or accessible by the appropriate mobile and base stations (block 264).

While the present invention has been described with respect to a particular embodiment, those skilled in the art will recognize that the present invention is not limited to the specific example embodiments described and illustrated herein. Different formats, embodiments, and adaptations besides those shown and described as well as many modifications, variations, and equivalent arrangements may also be used to implement the invention. Alternatively, a power control indicator may be communicated using techniques other than adding one or more flag bits to a fast transmit power control message to effect a change in power control type as long as signaling overhead is not significantly increased. Accordingly, it is intended that the invention be limited only by the scope of the claims appended hereto.

What is claimed is:

1. A method for controlling the transmit power of a radio transceiver, comprising:
   detecting a parameter value of a signal received from the radio transceiver;
   comparing the detected signal parameter value with a desired signal parameter value and determining a difference;
   sending a transmit power control command to the radio transceiver; and
   sending a power control indicator associated with the transmit power control command indicating whether a first or a second type of power control adjustment should be used by the radio transceiver depending on the difference.

2. The method in claim 1, wherein the power control indicator includes only a single flag bit.

3. The method in claim 1, wherein the power control indicator does not include the first or second type of power control adjustments.

4. The method in claim 1, wherein the method is implemented in a radio network node and the radio transceiver is a mobile station.

5. The method in claim 1, wherein the method is implemented in a mobile station and the radio transceiver is a base station.

6. The method in claim 1, wherein the signal parameter is a radio carrier-to-interference ratio (CIR).

7. The method in claim 1, wherein the transmit power control command instructs the radio transceiver to increase, decrease, or maintain transmit power.

8. The method in claim 1, wherein the first and second types of power control adjustment determine an amount by which the radio transceiver adjusts its transmit power.

9. The method in claim 8, wherein the first type of power control adjustment is a first amount to be used under a first type of transmission condition, and wherein the second type of power control adjustment is a second amount to be used under a second type of transmission condition.

10. The method in claim 9, wherein the first amount is a default amount and the second amount is larger or smaller than the default amount depending on the transmission condition.

11. The method in claim 1, further comprising:
   providing the radio transceiver at a first frequency, the first and second power control adjustments,
   wherein the transmit power control commands are sent at a second frequency greater than the first frequency.

12. The method in claim 1, wherein transmit power control commands instruct the radio transceiver to increase or to decrease transmit power, and the power control indicator is a flag bit which at a first value indicates a first amount to increase or decrease transmit power and at a second value indicates a second amount to increase or decrease transmit power.

13. The method in claim 1, wherein the first and second type of power control adjustments include a first and second power control scheme, respectively.

14. The method in claim 1, wherein the power control indicator corresponds to one of different patterns of the transmit power control command.

15. The method in claim 1, wherein the power control indicator is included with the transmit power control command.

16. The method in claim 1, wherein the power control indicator is included with a control message other than the transmit power control command frequently sent to the radio transceiver.

17. The method in claim 1, wherein the sending of the power control indicator is performed with minimal increase in signaling overhead.

18. A method for controlling the transmit power of a mobile station transmitting to a radio network, comprising:
   detecting at a first frequency a signal-to-interference parameter value of a signal received from the mobile radio;
   comparing the detected signal-to-interference parameter value with a desired signal-to-interference parameter value and determining a difference;
   comparing the difference with a threshold;
   sending a transmit power control command to the mobile station to possibly increase or decrease its transmit power depending on the difference; and
   associating with the transmit power control command a power control indicator indicating that a first type of power control adjustment should be used by the mobile station if the difference is less than the threshold and that a second type of power control adjustment should be used by the mobile station if the difference is greater than or equal to the threshold.

19. The method in claim 18, further comprising:
   providing to the mobile station at a second frequency less than the first frequency the first and second types of power control adjustments.

20. The method in claim 18, wherein transmit power control commands and the power control indicator are sent over a slotted channel, and the first frequency corresponds to a time slot frequency.

21. The method in claim 18, wherein the first and second types of adjustments include first and second power adjustment control procedures.

22. The method in claim 18, wherein the first and second types of adjustments include first and second power adjustment step sizes.

23. The method in claim 18, wherein the difference is compared to plural thresholds, each threshold having a corresponding type of power control adjustment.

24. The method in claim 18, wherein the power control indicator includes only a single flag bit.

25. The method in claim 18, wherein the power control indicator does not include the first or second type of power control adjustments.

26. A mobile transceiver capable of communicating with a radio network, comprising:
   a transceiver including a radio transmitter and a radio receiver; and
   a controller having first and second types of power control adjustments and receiving from the radio network transmit power control commands to increase or decrease a transmit power level of the transmitter and a power control indicator indicating whether the first or second type of power control adjustment should be employed,
   wherein the controller is configured to adjust the transmit power level of the transmitter using one of the first and second types of power control adjustments depending on a value of the power control indicator.

27. The mobile transceiver in claim 26, wherein the received power control indicator is associated with one of the transmit power control commands.

28. The mobile transceiver in claim 26, wherein the power control indicator includes only a single flag bit.

29. The mobile transceiver in claim 26, wherein the power control indicator does not include the first or second type of power control adjustments.

30. The mobile transceiver in claim 26, wherein transmit power control commands and the power control indicator are sent over a slotted channel, and the transmit power control commands are sent at a time slot frequency.

31. The mobile transceiver in claim 26, wherein the first and second types of adjustments include first and second power adjustment control procedures.

32. The mobile transceiver in claim 26, wherein the first and second types of adjustments include first and second power adjustment step sizes.

33. A radio network node sending power control commands to a radio transceiver, comprising:

a detector for detecting a signal parameter value of a signal received from the radio transceiver;

a comparator for comparing the detected signal parameter value with a desired signal parameter value and determining a difference; and a transmitter for transmitting a transmit power control command to the radio transceiver and a power control indicator indicating whether a first or a second type of power control adjustment should be used by the radio transceiver depending on the difference.

34. The radio network node in claim 33, wherein the radio network node includes a base station.

35. The radio network node in claim 33, wherein the radio network node includes a radio network controller.

36. The radio network node in claim 33, wherein the a power control indicator corresponds to a flag bit and does not include the first or second type of power control adjustments.

37. The radio network node in claim 33, wherein the signal parameter is a carrier-to-interference ratio (CIR).

38. The radio network node in claim 33, wherein the transmit power control command instructs the radio transceiver to increase or decrease transmit power, and wherein the first and second types of power control adjustment determine an amount by which the radio transceiver adjusts its transmit power.

39. The radio network node in claim 33, wherein the first type of power control adjustment is a first amount to be used under a first type of transmission condition, and wherein the second type of power control adjustment is a second amount to be used under a second type of transmission condition.

40. The radio network node in claim 33, further comprising:

means for providing the radio transceiver at a first frequency, the first and second power control adjustments, wherein the transmitter transmits the transmit power control commands at a second frequency greater than the first frequency.

41. The radio network node in claim 33, wherein the power control indicator corresponds to one of different patterns of the transmit power control command.

42. The radio network node in claim 33, wherein the power control indicator is included with the transmit power control command.

43. The radio network node in claim 33, wherein the power control indicator is included with a control message other than the transmit power control command frequently sent to the radio transceiver.

44. The radio network node in claim 33, wherein the sending of the power control indicator is performed with minimal increase in signaling overhead.

\* \* \* \* \*